United States Patent
Seok et al.

(10) Patent No.: US 10,209,577 B2
(45) Date of Patent: Feb. 19, 2019

(54) LIQUID CRYSTAL DISPLAY PANEL

(71) Applicant: LG DISPLAY CO., LTD., Seoul (KR)

(72) Inventors: Jaemin Seok, Gumi-si (KR); Hun Jeoung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/793,678

(22) Filed: Oct. 25, 2017

(65) Prior Publication Data
US 2018/0120604 A1    May 3, 2018

(30) Foreign Application Priority Data
Oct. 31, 2016  (KR) .................. 10-2016-0143377

(51) Int. Cl.
*G02F 1/1333* (2006.01)
*G02F 1/1339* (2006.01)
*G02F 1/1345* (2006.01)

(52) U.S. Cl.
CPC .......... *G02F 1/1339* (2013.01); *G02F 1/1345* (2013.01); *G02F 1/133345* (2013.01); *G02F 2001/133354* (2013.01)

(58) Field of Classification Search
CPC .................. G02F 1/1339; G02F 1/133345
See application file for complete search history.

(56) References Cited

U.S. PATENT DOCUMENTS

2003/0090615 A1*  5/2003  Park .................. G02F 1/1339
                                                          349/153

FOREIGN PATENT DOCUMENTS

KR         10-0972148 B1      7/2010

* cited by examiner

*Primary Examiner* — Phu Vu
(74) *Attorney, Agent, or Firm* — Birch, Stewart, Kolasch & Birch, LLP

(57) ABSTRACT

A liquid crystal display panel in one example includes first and second substrates facing each other; a sealant disposed between the first and second substrates, and corresponding to a perimeter of a display area; a first protective layer disposed over the first substrate; a second protective layer disposed over the first protective layer; and an adhesive groove part overlapping the sealant, and including a first contact groove passing through the first and second protective layers, and a second contact groove disposed adjacent to the first contact groove and passing through the second protective layer. Due to the adhesive groove part, the sealant can adhere to each of the first and second protective layers, whereby the attachment force of the liquid crystal display panel can be enhanced.

5 Claims, 5 Drawing Sheets

LIQUID CRYSTAL DISPLAY PANEL

CROSS-REFERENCE TO RELATED APPLICATION

This application claims the priority benefit of Korean Patent Application No. 10-2016-0143377, filed on Oct. 31, 2016, in the Korean Intellectual Property Office, the disclosure of which is incorporated by reference into the present application.

BACKGROUND

1. Technical Field

The present disclosure relates to a liquid crystal display panel including a pair of substrates facing each other, and a sealant provided to attach the pair of substrates to each other.

2. Description of the Related Art

Display devices are used in various electronic devices such as TVs, cellular phones, and tablet PCs. As a result, research on reducing the thickness, the weight, and the power consumption of such a display device is continuing.

Representative examples of the display devices include a liquid crystal display (LCD) device, a plasma display panel (PDP) device, a field emission display (FED) device, an electroluminescence display (ELD) device, an electro-wetting display (EWD) device, and an organic light emitting display (OLED) display.

Such a display device includes a display panel having a display surface on which an image is substantially displayed, and a driving unit configured to drive the display panel.

Generally, the display panel includes a polarized material or luminescence material disposed between an upper substrate and a lower substrate, and a sealant provided to attach the upper substrate and the lower substrate to each other.

However, the polarized material or the luminescence material may be deteriorated or contaminated by external oxygen or water, and be formed of liquid material which is hardly fixed in a certain shape or position. Therefore, there is a problem in that the polarized material or the luminescence material between the upper substrate and the lower substrate may be damaged if the attachment between the upper substrate and the lower substrate is defective.

Particularly, in order to increase the area of the display surface of the display panel, there is a need for reducing a bezel area formed around the display surface.

In this case, the width of a sealant area formed in the bezel area is reduced, thus causing a problem of a reduction in adhesive force of the sealant.

Furthermore, in the case where functions such as a touch sensing function are added to the display device, the number of circuit lines disposed in the bezel area is increased. In contrast, the width of the bezel area is limited. Therefore, the number of conductive layers may be increased to embody the structure having an increased number of circuit lines. In this case, the thickness of the display panel is increased by the increased number of conductive layers. Hence, the attachment force may be reduced, and the display panel may be easily deformed by external force, whereby a defect in attachment may be easily caused.

SUMMARY OF THE EMBODIMENTS

Various embodiments are directed to a liquid crystal display panel having a structure capable of enhancing adhesive force of a sealant, and thus enhancing attachment force of the display panel.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In an embodiment, a liquid crystal display panel may include first and second substrates facing each other; a sealant disposed between the first and second substrates, and corresponding to a perimeter of a display area; a first protective layer disposed over the first substrate; a second protective layer disposed over the first protective layer; and an adhesive groove part overlapping the sealant, and including a first contact groove passing through the first and second protective layers, and a second contact groove disposed adjacent to the first contact groove and passing through the second protective layer.

The first contact groove may be formed in a shape in which S-shaped curved lines extending in a longitudinal direction are repeatedly arranged. The second contact groove may be formed in a shape in which S-shaped curved lines extending in the longitudinal direction and symmetric with the first contact groove are repeatedly arranged. The first and second contact grooves may be twisted with each other.

Due to the adhesive groove part, the adhesive area of the sealant may be increased, whereby the attachment force may be enhanced without an increase in width of a bezel area.

DETAILED DESCRIPTION OF THE EMBODIMENTS

Hereinafter, a liquid crystal display panel according to embodiments of the present disclosure will be described in detail with reference to the accompanying drawings. Various types of display devices can include the liquid crystal display panel discussed according to one or more embodiments of the present disclosure. Further, the term 'may' here includes the full meaning(s) of a term 'can'.

First, the liquid crystal display panel according to an embodiment of the present disclosure will be described with reference to FIGS. 1 to 3. All the components of the liquid crystal display panel according to all embodiments of the present disclosure are operatively coupled and configured.

Figure 1:
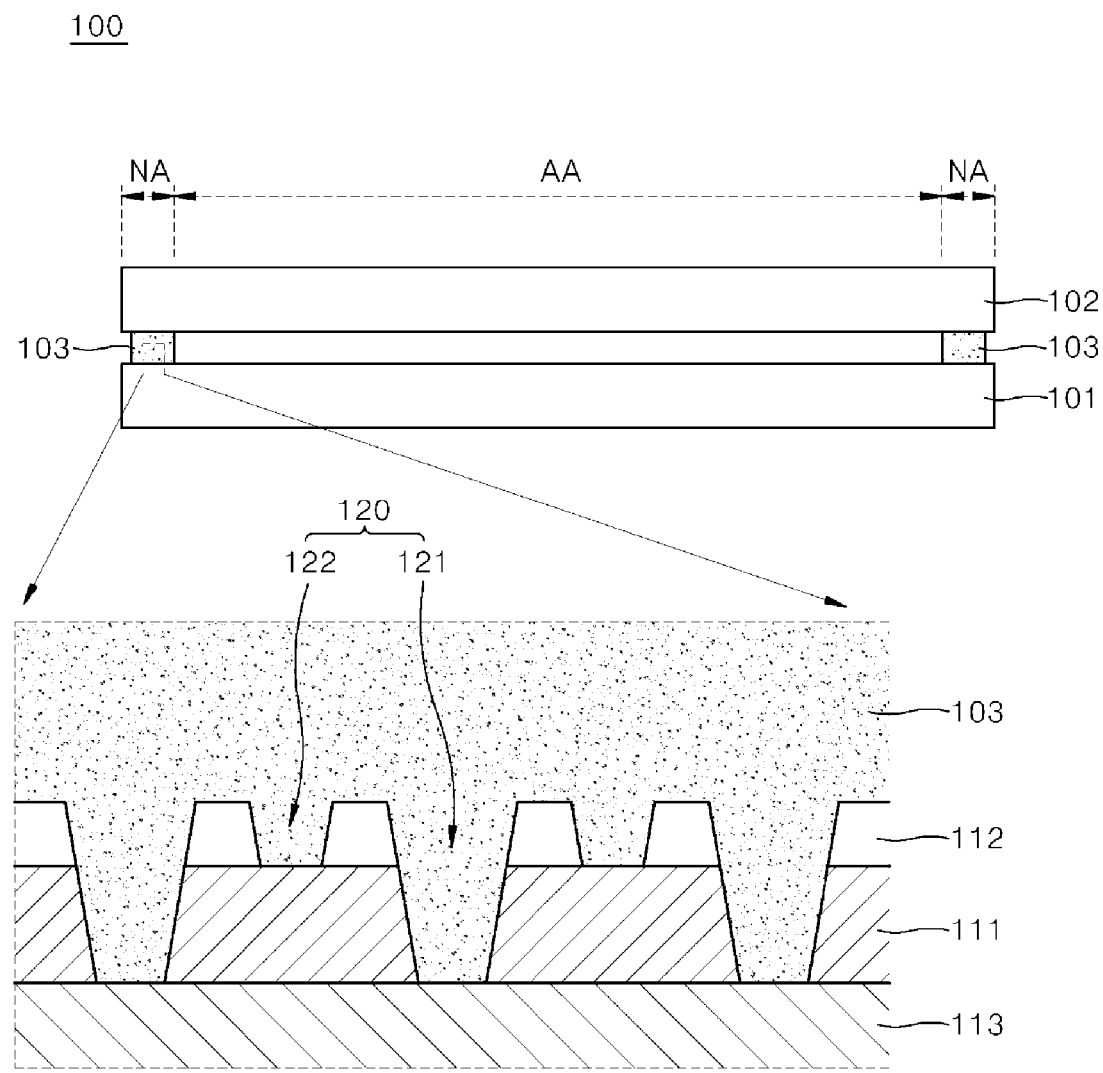
FIG. 1 is a view showing a cross-section of a liquid crystal display device according to an embodiment of the present disclosure.

FIG. 1 is a diagram showing a cross-section of the display panel according to the embodiment of the present disclosure. FIG. 2 is a plan view illustrating an example of an adhesive groove part of FIG. 1. FIG. 3 is a plan view illustrating another example of the adhesive groove part of FIG. 1.

As shown in FIG. 1, a liquid crystal display panel 100 according to the embodiment of the present disclosure includes first and second substrates 101 and 102 facing each other, a sealant 103 disposed between the first and second substrates 101 and 102 and corresponding to a perimeter of a display area AA, a first protective layer 111 disposed on the first substrate 101, a second protective layer 112 disposed on the first protective layer 111, and an adhesive groove part 120 overlapping the sealant 103.

The adhesive groove part 120 is formed of a first contact groove 121 passing through both the first and second protective layers 111 and 112, and a second contact groove 122 disposed adjacent to the first contact groove 121 and passing through only the second protective layer 112.

The liquid crystal display panel 100 further includes an interlayer insulating layer 113 disposed under the first protective layer 111. Thus, the first contact groove 121 exposes portions of the interlayer insulating layer 113.

Here, each of the interlayer insulating layer 113, the first protective layer 111, and the second protective layer 112 is made of inorganic insulating material or organic insulating material.

Particularly, at least one of the interlayer insulating layer 113, the first protective layer 111, and the second protective layer 112 may be made of organic insulating material, and the other layers may be made of inorganic insulating material. For example, the interlayer insulating layer 113 and the second protective layer 112 may be made of inorganic insulating material such as $SiN_x$ or $SiO_y$, and the first protective layer 111 may be made of organic insulating material.

According to the embodiment of the present disclosure, the liquid crystal display panel includes the adhesive groove part 120 that overlaps the sealant 103 and exposes the first protective layer 111 and the interlayer insulating layer 113. Therefore, the sealant 103 disposed on the second protective layer 112 may come into contact not only with the second protective layer 112 but also with each of the first protective layer 111 and the interlayer insulating layer 113 through the adhesive groove part 120.

As such, the sealant 103 adheres not only to the second protective layer 112 but also to each of the first protective layer 111 and the interlayer insulating layer 113. Thereby, regardless of the material of the second protective layer 112, the adhesive force between the sealant 10 and the insulating materials 111, 112, and 113 may be further enhanced.

According to the embodiment of the present disclosure, the adhesive groove part 120 has a twist shape in which two curved lines symmetric with each other are twisted. Hence, despite the limited area of a bezel area NA, the contact area of the sealant 103 on the first substrate 101 may be increased. Here, the bezel area NA corresponds to the perimeter of the display area AA. The sealant 103 is disposed on at least a portion of the bezel area NA that corresponds to the perimeter of the display area AA.

Figure 2:
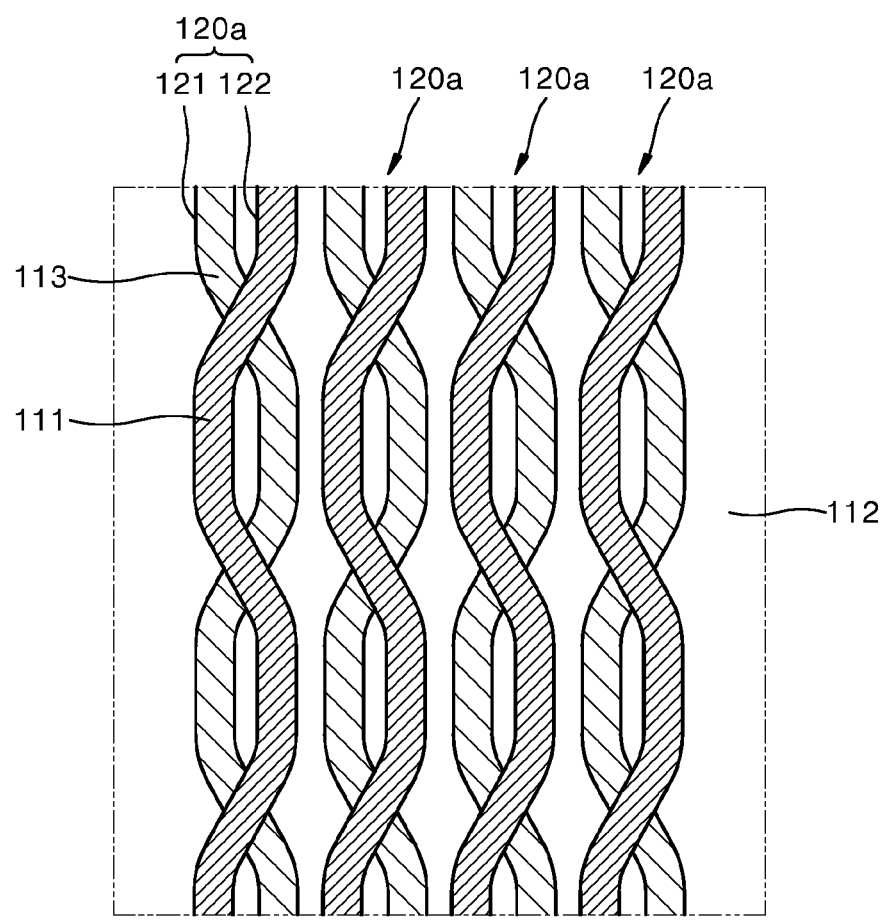
FIG. 2 is a plan view illustrating an example of an adhesive groove part of FIG. 1.

In detail, as shown in FIG. 2, with regard to an adhesive groove part 120a according to an embodiment, the first and second contact grooves 121 and 122 are twisted with each other. Any one of the first and second contact grooves 121 and 122 is formed in a shape in which S-shaped curved lines are repeatedly arranged in a longitudinal direction. The other one of the first and second contact grooves 121 and 122 is formed in a shape in which curved lines symmetric with the S-shaped curved lines are repeatedly arranged in the longitudinal direction.

For example, first contact grooves 121 which expose the interlayer insulating layer 113 have a shape in which S-shaped curved lines are repeatedly arranged in the longitudinal direction (an up-and-down direction of FIG. 2). In addition, second contact grooves 122 which expose the first protective layer 111 have a shape in which C-shaped curved lines each of which is symmetric with the corresponding first contact groove 121 are repeatedly arranged in the longitudinal direction.

The widths of the first and second contact grooves 121 and 122 may be within a similar range. In this case the width of the interlayer insulating layer 113 that is exposed through the first contact groove 121 may be same as or similar to the width of the first protective layer 111 that is exposed through the second contact groove 122. Hence, the adhesive areas between the sealant 103 and the respective first protective layer 111 and the interlayer insulating layer 113 may be similar to each other, whereby the attachment force may be enhanced.

According to an embodiment, the second contact groove 122 may be disposed at the intersections between the first and second contact grooves 121 and 122.

Two or more adhesive groove parts 120a, each of which has a chain shape in which two curved lines are twisted, may be provided at positions spaced apart from each other.

Because the two or more adhesive groove parts 120a are provided, the first and second contact grooves 121 and 122 are alternately disposed one by one in a lateral direction (a left-and-right direction of FIG. 2) in portions other than the intersections between the first and second contact grooves 121 and 122.

Figure 3:
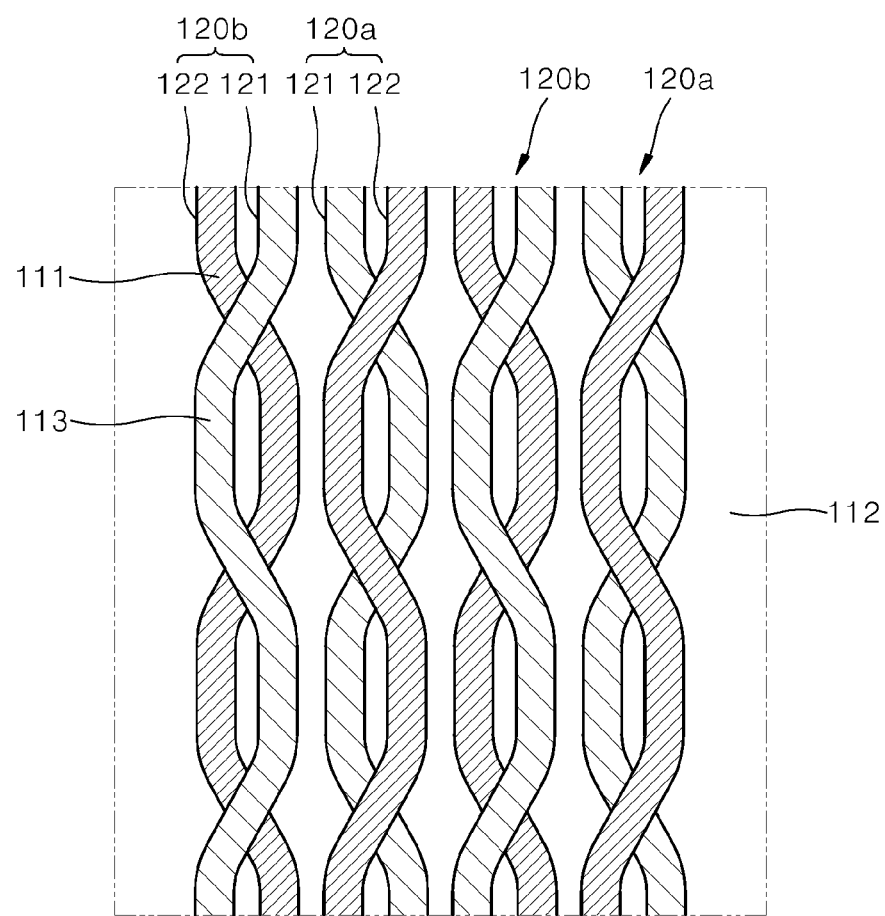
FIG. 3 is a plan view illustrating another example of the adhesive groove part of FIG. 1.

Alternatively, as shown in FIG. 3, according to another embodiment, two or more adhesive groove parts 120a and 120b are provided, wherein a pair of adhesive groove parts 120a and 120b adjacent to each other are symmetrical with each other.

In other words, the first adhesive groove part 120a of each pair of adjacent adhesive groove parts 120a and 120b is formed in a shape in which the second contact groove 122 exposing the first protective layer 111 is disposed at each intersection between the first and second contact grooves 121 and 122. On the other hand, the second adhesive groove part 120b is symmetrical with the first adhesive groove part 120a and is formed in a shape in which the first contact groove 121 exposing the interlayer insulating layer 113 is disposed at intersections between the first and second contact grooves 121 and 122.

According to this embodiment, since the two or more first and second adhesive groove parts 120a and 120b are disposed in this way, the first and second contact grooves 121 and 122 are alternately disposed two by two in the lateral direction (the left-and-right direction of FIG. 2) in portions other than the intersections between the first and second contact grooves 121 and 122.

Furthermore, the first contact grooves 121 and the second contact grooves 122 are alternately disposed at the intersection between the first and second contact grooves 122 and 122.

In this way, unlike the pattern of FIG. 2, in the arrangement of the adhesive groove parts 120a and 120b of FIG. 3, proportions between the first and second contact grooves 121 and 122 may be similar to each other. Hence, the adhesive areas between the sealant 103 and the respective first protective layer 111 and interlayer insulating layer 113 may be further similar to each other, whereby the attachment force may be further enhanced.

As such, according to the embodiment of the present disclosure, since the adhesive contact portions 120a and 120b are formed in a twisted shape, the contact area between the sealant 103 and the insulating materials 111, 112, and 113 may be increased despite a limited surface area. Therefore, the adhesive force of the sealant 103 may be further enhanced.

Figure 4:
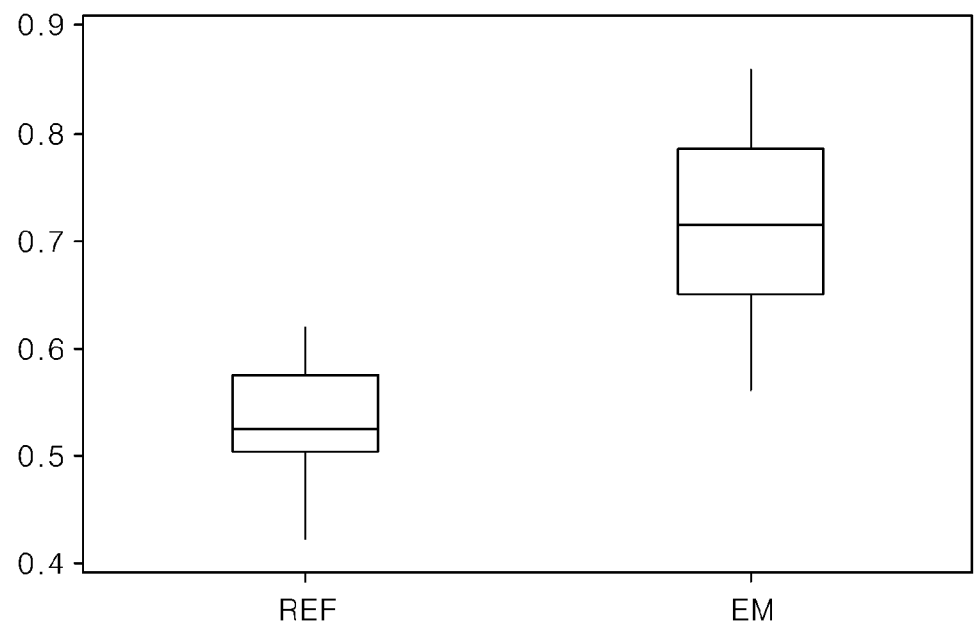
FIG. 4 is a view showing attachment force of a general liquid crystal display panel and attachment force of the liquid crystal display device according to the embodiment of the present disclosure.

FIG. 4 is a view showing attachment force of a general liquid crystal display panel and attachment force of the liquid crystal display device according to the embodiment of the present disclosure. In FIG. 4, there is illustrated the case where the general liquid crystal display panel REF includes a linear adhesive groove part.

As shown in FIG. 4, the average of the attachment force EM of the liquid crystal display panel according to the embodiment of the present disclosure is approximately 0.72 kgf, while the average of the attachment force REF of the general liquid crystal display panel is approximately 0.53 kgf. As such, it can be understood that the attachment force EM of the liquid crystal display panel according to the embodiment of the present disclosure is enhanced by approximately 34.4% compared to that of the general liquid crystal display panel.

Next, other elements of the liquid crystal display panel in accordance with the embodiment of the present disclosure will be described with reference to FIGS. 5 and 6.

Figure 5:
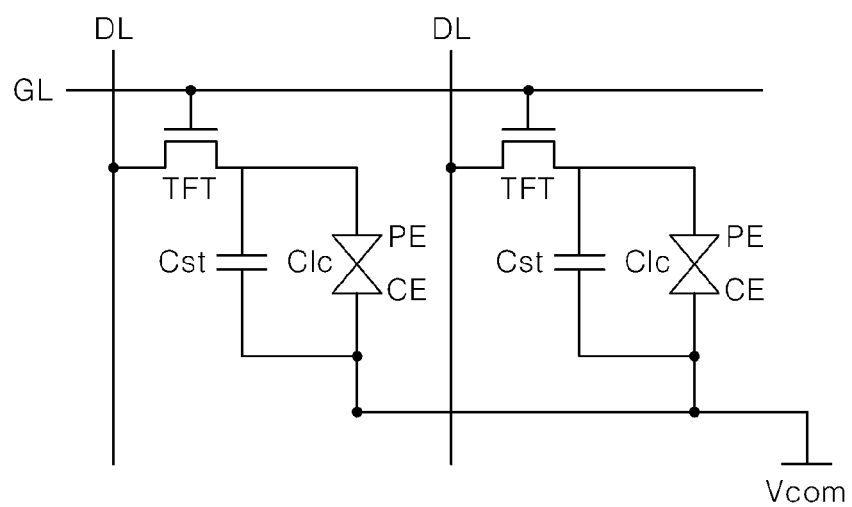
FIG. 5 is a view illustrating an example of an equivalent circuit of the liquid crystal display panel of FIG. 1.

FIG. 5 is a view illustrating an example of an equivalent circuit of the liquid crystal display panel of FIG. 1. FIG. 6 is a view illustrating an example of a cross-section of any one pixel area in the liquid crystal display panel of FIG. 5.

As shown in FIG. 5, the liquid crystal display panel 100 according to the embodiment of the present disclosure includes gate lines GL and data lines DL that are arranged in directions intersecting each other such that a plurality of pixel areas are defined in the display area AA. Each pixel area of the liquid crystal display panel 100 includes a thin film transistor TFT coupled to the corresponding gate line GL and the corresponding data line DL, a pixel electrode PE and a storage capacitor Cst that are coupled to the thin film transistor TFT, and a common electrode CE that is coupled to a common power source Vcom. Here, a capacitance of liquid crystal materials to be affected by an electric field generated between the pixel electrode PE and the common electrode CE is defined as a liquid crystal capacitor Clc.

In each pixel area of the liquid crystal display panel 100, when the thin film transistor TFT is turned on based on a gate signal of the gate line GL, a data signal of the data line DL is supplied to the pixel electrode PE through the turned-on thin film transistor TFT. Furthermore, since a common signal of the common power source Vcom is supplied to the common electrode CE, the liquid crystal capacitor Clc and the storage capacitor Cst between the pixel electrode PE and the common electrode CE are charged, so that a predetermined electric field is generated between the pixel electrode PE and the common electrode CE. Due to this electric field, liquid crystal materials in a liquid crystal layer are tilted so that a light transmittance of each pixel area is adjusted.

Figure 6:
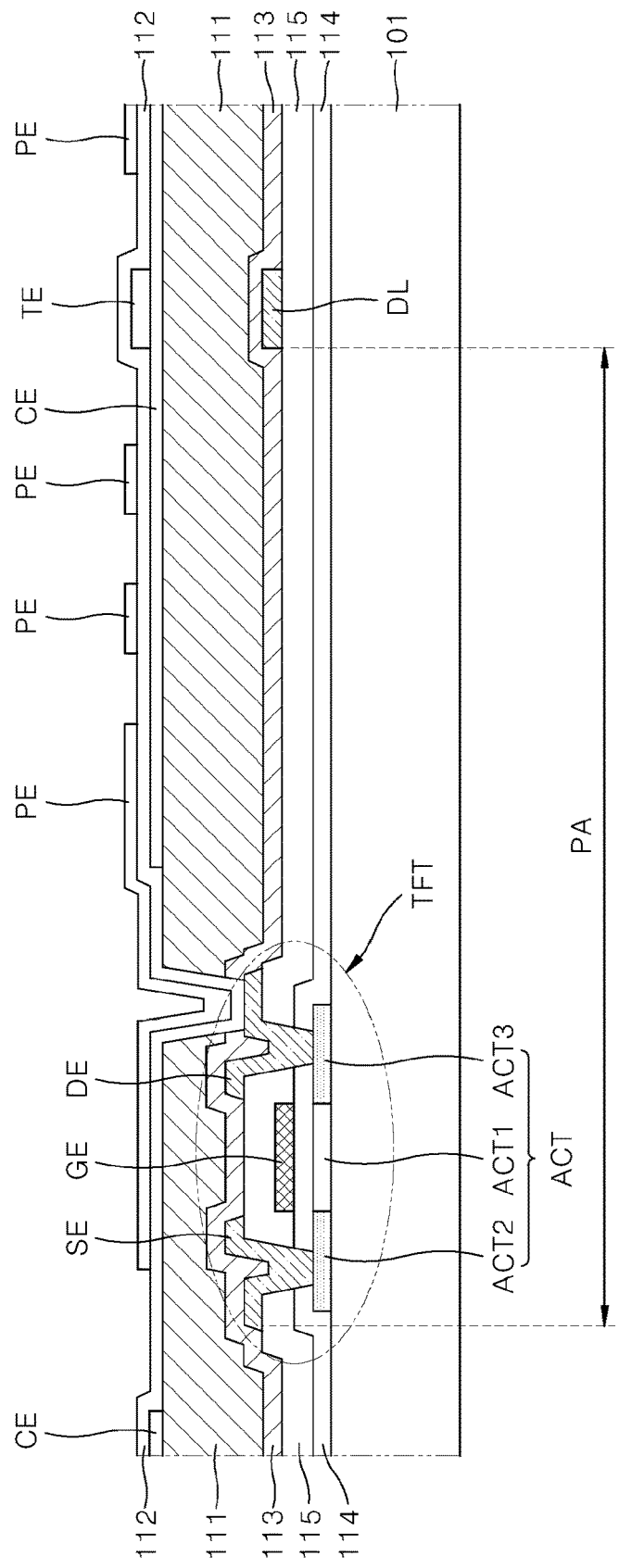
FIG. 6 is a view illustrating an example of a cross-section of any one pixel area in the liquid crystal display panel of FIG. 5.

As shown in FIG. 6, the thin film transistor TFT of each pixel area PA may include an active layer ACT that is disposed on the first substrate 101 and includes a channel area ACT1, and a source area ACT2 and a drain area ACT3 which are disposed on opposite sides of the channel area ACT1; a gate electrode GE that is disposed on a gate insulating layer 114 covering the active layer ACT and overlaps the channel area ACT1; a source electrode SE that is disposed on a source-drain insulating layer 115 covering the gate electrode GE and is coupled to the source area ACT2, and a drain electrode DE that is disposed on the source-drain insulating layer 115 and coupled to the drain area ACT3.

The gate line GL along with the gate electrode GE may be disposed on the gate insulating layer 114. The data line DL along with the source electrode SE may be disposed on the source-drain insulating layer 115.

The gate line GL, the data line DL, and the thin film transistor TFT is covered with the interlayer insulating layer 113.

The first protective layer 111 is disposed on the interlayer insulating layer 113. For example, the interlayer insulating layer 113 may be made of inorganic insulating material taking into account the adhesive force to metal, and the first protective layer 114 may be made of organic insulating material taking into account the dielectric permittivity and the thickness thereof.

However, this is only for illustrative purpose, and if the first protective layer 111 is made of insulating material meeting conditions including the dielectric permittivity, the thickness, and the adhesive force to the metal, the interlayer insulating layer 113 may be omitted. In this case, the source-drain insulating layer 115 is disposed under the first protective layer 111.

The common electrode CE may be disposed on the first protective layer 111.

In the case where the liquid crystal display panel 100 has a touch sensing function, it may further include a touch sensing electrode TE coupled to the common electrode CE.

The pixel electrode PE may be disposed on the second protective layer 112 that covers the common electrode CE and the touch sensing electrode TE. The pixel electrode PE is coupled to the drain electrode DE of the thin film transistor TFT through a pixel contact hole passing through the interlayer insulating layer 113 and the first and second protective layers 111 and 112.

As described above, the liquid crystal display panel 100 according to an embodiment of the present disclosure includes the sealant 103 disposed on the perimeter of the display area AA between the first and second substrate 101 and 102, and the adhesive groove part 120 that is formed in the perimeter of the display area AA and overlaps the sealant 103.

The adhesive groove part 120 includes the first contact groove 121 passing through both the first and second protective layers 111 and 112, and the second contact groove 122 passing through the second protective layer 112. Thus, the sealant 103 disposed on the second protective layer 112 may adhere not only to the second protective layer 112 but also to the first protective layer 111 and the interlayer insulating layer 113 through the adhesive groove part 120. Therefore, regardless of the material of the second protective layer 112, the adhesive force between the sealant 10 and the insulating materials 111, 112, and 113 may be further enhanced.

In addition, because the adhesive part 120 has a shape in which two curved lines are symmetric with each other, the adhesive area of the sealant 103 may be increased despite a limited width of the bezel area NA.

Consequently, according to an embodiment of the present disclosure, the attachment force of the liquid crystal display panel 100 may be enhanced without increasing the width of the bezel area NA.

While various embodiments have been described above, it will be understood to those skilled in the art that the embodiments described are by way of example only. Accordingly, the disclosure described herein should not be limited based on the described embodiments.

What is claimed is:

1. A liquid crystal display panel comprising:
    first and second substrates facing each other;
    a sealant disposed between the first and second substrates, and corresponding to a perimeter of a display area;
    a first protective layer disposed over the first substrate;
    a second protective layer disposed over the first protective layer; and
    an adhesive groove part overlapping the sealant, and including a first contact groove passing through the first and second protective layers, and a second contact groove disposed adjacent to the first contact groove and passing through the second protective layer,
    wherein the first and second contact grooves are twisted with each other,
    wherein one of the first and second contact grooves is formed in a shape in which S-shaped curved lines are repeatedly arranged in a longitudinal direction, and
    wherein the other one of the first and second contact grooves is formed in a shape in which curved lines symmetric with the S-shaped curved lines are repeatedly arranged in the longitudinal direction.

2. The liquid crystal display panel according to claim 1, wherein the adhesive groove part comprises two or more adhesive groove parts spaced apart from each other.

3. The liquid crystal display panel according to claim 2, wherein, among the two or more adhesive groove parts, a pair of adhesive groove parts adjacent to each other are symmetrical with each other.

4. The liquid crystal display panel according to claim 1, further comprising:
    a gate line and a data line disposed over the first substrate, and intersecting each other such that a plurality of pixel areas are defined on the display area; and
    a plurality of thin film transistors disposed over the first substrate, and corresponding to the plurality of pixel areas,
    wherein the gate line, the data line, and the plurality of thin film transistors are covered with the first protective layer.

5. The liquid crystal display panel according to claim 4, further comprising:
    an interlayer insulating layer disposed under the first protective layer and configured to cover the gate line, the data line and the plurality of thin film transistors,
    wherein the first contact groove exposes a portion of the interlayer insulating layer, and
    wherein the sealant is contact and adhered to the interlayer insulating layer through the first contact groove while the sealant is contact and adhered to the first protective layer through the second contact groove.

* * * * *